Feb. 1, 1955 L. N. REES Re. 23,934
LOG-HANDLING APPARATUS
Original Filed May 20, 1949 2 Sheets-Sheet 1
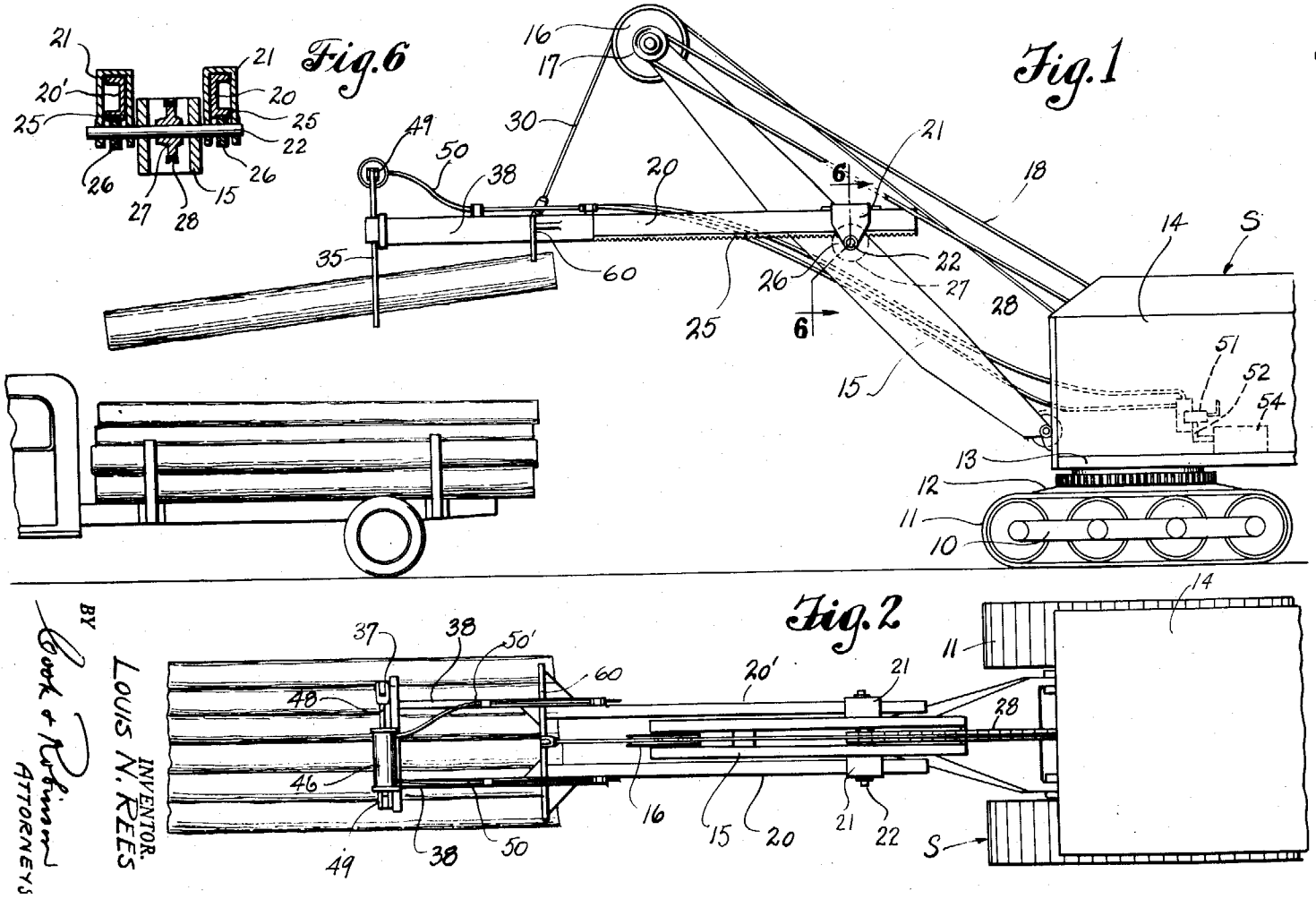
INVENTOR.
LOUIS N. REES
BY Cook & Robinson
ATTORNEYS

LOG-HANDLING APPARATUS

Original Filed May 20, 1949 2 Sheets-Sheet 2

INVENTOR.
LOUIS N. REES
BY
Cook & Robinson
ATTORNEYS

United States Patent Office

Re. 23,934
Reissued Feb. 1, 1955

23,934

LOG-HANDLING APPARATUS

Louis N. Rees, Cathlamet, Wash.

Original No. 2,613,831, dated October 14, 1952, Serial No. 94,439, May 20, 1949. Application for reissue September 10, 1954, Serial No. 455,374

4 Claims. (Cl. 214—147)

Matter enclosed in heavy brackets [ ] appears in the original patent but forms no part of this reissue specification; matter printed in italics indicates the additions made by reissue.

This invention relates to log handling apparatus, and more particularly to apparatus for the lifting and loading of logs of large size. Specifically stated, the invention has to do with apparatus designed for use in logging operations, for the lifting of logs from the ground or from yarded piles, and placing them on cars or trucks for transportation; it being the principal object of the present invention to provide a means of the above kind that is applicable to the ordinary types of power shovels to adapt them for the economical and expeditious handling of logs in loading operations.

It is also an object of the present invention to adapt present day types of power shovels for the handling of large logs by equipping the dipper stick, in lieu of the usual dipper or bucket, with log gripping tongs and heeling plate, in a relationship and manner that provides for the picking up and handling of logs under positive control.

Another object of the invention is to provide an apparatus as above stated for the handling of logs, characterized by the use, at the outer end of the dipper or boom stick, of a pair of log gripping tongs operable by a double-acting air cylinder, and which tongs are rigidly associated with the boom stick so that a log, as held thereby and as engaged against the heeling plate, will be rigidly supported relative to the stick and can be raised, lowered and swung to various positions under positive control, as distinguished from that degree of control that is obtained where cable suspended tongs are employed in connection with a swinging boom.

Still another object of the invention is to provide a log loading or handling device that eliminates the requirement for ground workmen and makes possible the picking up and loading or unloading of logs under control of the shovel operator alone.

Other objects of the invention reside in the details of construction and combination of parts embodied in the tongs and their control devices, and in the combination with the boom of the power mechanism of the tongs and the present novel form of heeling plate.

In accomplishing the above mentioned and other objects of the invention, I have provided the improved details of construction, the preferred forms of which are illustrated in the accompanying drawings, wherein:

Fig. 1 is a side elevation of a machine of power shovel type equipped with log loading means embodied by the present invention, and illustrating the operation of loading a log onto a truck.

Fig. 2 is a top or plan view of the same.

Fig. 6 is a cross-sectional detail taken on line 6—6 in Fig. 1.

Figure 3:
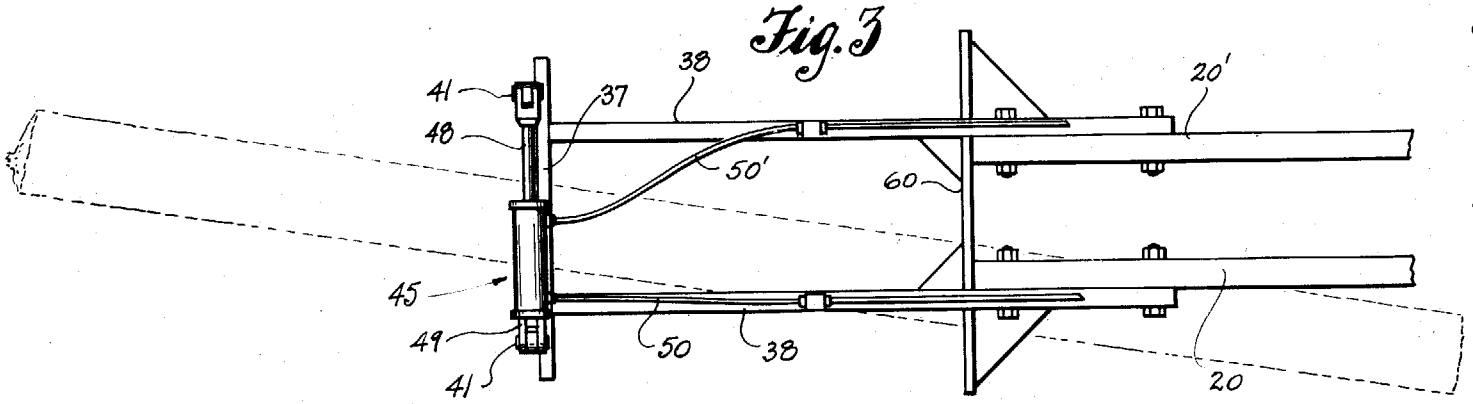
Fig. 3 is an enlarged plan view of the mounting parts for the paired tongs and their operating cylinder as mounted at the outer end of the boom stick.
Figure 5:
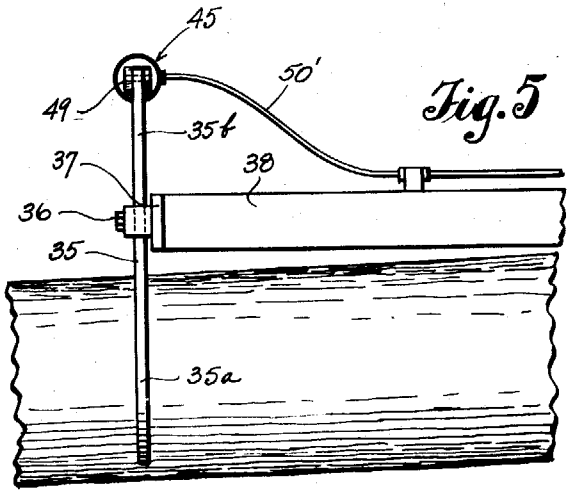
Fig. 5 is a side view of the tongs as applied to a log.

Referring more in detail to the drawings:

It is the intent that the present log loading equipment be applicable to any of the ordinary types or makes of power shovels and machines of corresponding types, either by first removing the dipper from the dipper stick and attaching the present tong mechanism and heeling plate to the outer end of the stick, or by removing the original dipper stick and its dipper or bucket in its entirety, and replacing it with a boom stick with the present equipment mounted on or made as a part thereof. In either instance, the log holding parts would comprise the same essential elements but probably would be less cumbersome when applied in the form last mentioned. The details of the power shovel are of no particular significance so long as the machine meets the usual requirements of rotation and has the usual boom mounted thereon equipped with an extendable and retractable stick and the usual adjusting means therefor.

In Figs. 1 and 2, I have illustrated a common form of power shovel and have designated it in its entirety by reference character S. It comprises a base structure 10 equipped with crawler tracks 11 and supporting a horizontal platform 12 on which a turntable 13 is mounted, and which latter mounts a cab 14 in which the shovel operating mechanism and control devices are located. In the present drawings, the usual cable winding drums and the various controls for the shovel are not shown, but it is to be understood that they could be of conventional form and usual mode of operation.

Hinged to the turntable is the main boom 15, equipped at its outer end with a large sheave wheel 16, revolvable on shaft 16', and at opposite sides of the boom, the shaft 16' mounts smaller sheaves 17, over which latter a cable 18 is extended, in the usual way, for the support and for the raising and lowering of the boom. The boom 15 is here shown as being in the form of a box beam and it is adapted to be adjusted up or down on its hinge axis in a vertical plane.

Supported by and extending from the boom 15 is a boom stick, comprising two parallel beams, 20 and 20', as noted in Fig. 2, contained for longitudinal adjustment in housings 21—21 that are pivoted on the boom 15, approximately midway of its ends, on opposite end portions of a cross shaft 22. In this case, the parallel beams 20—20' pass closely along opposite sides of the boom 15 and each is equipped along its underside with a rack bar 25. The rack bars engage, respectively, as seen in Fig. 6, with pinion gears 26 that are fixed on opposite ends of the pivot shaft 22. This shaft is rotatably mounted in the boom 15 and is adapted to be turned in opposite directions for the extending or retracting of the stick. The means herein shown for rotating the shaft comprises a sprocket wheel 27 on shaft 22, over which a chain belt 28 is extended as seen in Fig. 1.

To adjust and support the boom stick, a cable 30 is attached thereto near its outer end. This cable extends over the sheave wheel 16 at the outer end of the boom 15 and to a cable winding drum, or other suitable means, not shown, that is mounted on the turntable. The control of the boom stick in its inward and outward movements is effected in the usual manner. Also, the boom 15 is raised and lowered and the turning of the turntable in opposite directions is accomplished in the usual way.

Figure 4:
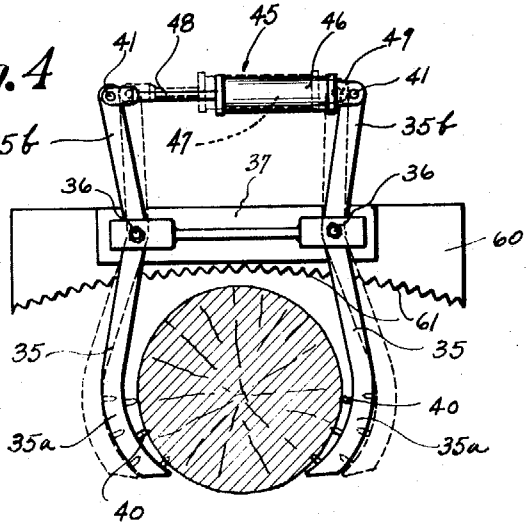
Fig. 4 is a front end elevation of the boom stick, showing the paired tongs and the tong operating air cylinder as applied thereto.

Mounted at the outer end of the boom stick is a pair of tongs 35—35. These tongs are disposed in laterally spaced relationship as best shown in Fig. 4, and are pivotally fixed by pivot bolts 36—36 on a horizontal cross bar 37; the latter being fixed to the outer end of a rectangular frame structure that in turn is fixed rigidly to the outer end of the boom stick as an extension thereof.

The cross bar 37 is shown in Fig. 3 to be fixed to paired beams 38—38 which, in turn, are bolted or otherwise fixed rigidly to the outer ends of the paired beams that are comprised as a part of the boom stick. The tongs are disposed in upright position as noted in Fig. 4, in a plane that is transverse to the direction of the stick 20 and substantially perpendicular thereto. Also, the paired tongs have lower end portions 35a that are so curved as to embrace the opposite sides of a log received between them and are preferably formed along the curved portions with inwardly directed spikes 40 designed to engage the held log to keep it from turning or slipping. The upper end portions, 35b, of the tongs extend above the pivot bolts 36—36 and are pivotally connected at their upper ends, as at 41—41, to opposite ends of a double acting air jack, designated in its entirety by numeral 45.

The air jack comprises a closed air cylinder 46 reciprocally containing a piston 47 from which a rod 48 extends. The cylinder has a lug 49 at one end which is connected by a pivot bolt 41 with the upper end portion of one of the tongs. The piston rod 48 is likewise connected by a pivot bolt 41 with the other tong.

Operating air is admitted from and into the opposite ends of the jack cylinder through flexible pipes or hose 50, 50' under control of a valve mechanism of any suitable kind as designated at 51. The valve is here shown to be connected by a conduit 52 with a source of air under pressure, designated at 54. It is to be understood that, through manual manipulation of the valve 51, the tongs may be opened, closed, held and released as desired by the operator. It is preferred that automatic, quick exhaust valves be used in the lines to expedite operation. Also, it is the intent that the control valve be located in the cab, readily and easily accessible to the operator and that flexible conduits extend from the valve to the connections 50—50' as indicated in dotted lines in Fig. 1.

Fixed transversely to the beams 38—38 which support the tongs is a heeling plate 60. This extends at its ends somewhat beyond the supporting beams and it is set vertically edgewise, and its longitudinal under edge is upwardly arched and formed therealong with downwardly pointed teeth 61 as best shown in Fig. 4. When a log is gripped between the tongs, its inner end is caused to engage against the heeling plate as in Fig. 1. The extending of the plate 60 to opposite sides of boom 20 permits logs that are of extra length to be angularly inclined relative to the boom and their inner end portions to be extended to a side of and beyond beam 15.

With the apparatus so constructed and applied to the boom of the power machine, its use would be as follows:

First, the power machine, designated by reference character S, is brought into such position that the logs to be handled may be easily reached. The truck or car to be loaded is also brought to position for loading, preferably by longitudinally aligning it with the turntable center. The location of the truck or car may be close to or it may be away from the location where the log is to be picked up to such extent as to require a 180° turn of the machine to place the log on the truck.

The log is engaged by turning the turntable 13 to a position to direct the booms toward or over the log, and then so manipulating the devices as to bring the boom stick into such position as to permit the paired tongs, in open position, to grasp the selected log between them. The opening and closing of the tongs is effected under control of the operator by manipulation of valve 51. The place of application of the tongs to the log should be such that the weight of that portion of the log beyond the tongs would be more than the inner end portion, and the inner end portion would thereby be caused, when the log is lifted, to engage solidly against the underedge of the heeling plate 60. Then, by means of the boom, the log can be lifted up and clear of any obstruction and carried to position over the truck. By extending or retracting the booms, the outer end of the log can be placed on the truck exactly where desired, then upon lowering the boom stick, the inner end can be carefully laid down, and finally released, merely by opening the tongs apart.

The main advantage of the present means resides in the fact that the log is rigidly supported and can be swung to position under rigid control. Its pick-up and also its disposition on a truck or car can be definitely controlled and entirely by the operator in the cab of the shovel. Large and small logs can be handled with equal control and efficiency.

Having thus described my invention, what I claim as new therein and desire to secure by Letters Patent is:

1. In a log loading vehicle of the type wherein a boom is mounted on a turntable and a boom stick is mounted on the boom for extension and retraction; and means is provided on the turntable for controlling the extension and retraction of the boom stick; a log handling structure rigidly applied to the boom stick at its outer end, and comprising a cross bar at the outer end thereof and a transversely directed heeling plate at the inner end thereof, a pair of upright, laterally spaced tongs pivoted on the cross bar with lower ends disposed to cooperatively receive a log between them, and having upper ends extended above their pivot points and a power device joining the upper ends of the tongs for actuating them to closed and open positions.

2. A device as in claim 1 wherein the heeling plate is set vertically edgewise, and has an upwardly arched, serrated lower edge against which a log supported by the tongs can be engaged to hold it in alignment with the stick with the turning of the turntable.

*3. In a log loading vehicle of the type wherein a boom is mounted on a turntable and a boom stick is mounted on the boom for extension and retraction; and means is provided on the turntable for controlling the extension and retraction of the boom stick; a log handling structure rigidly applied to the outer end of the boom stick as an extension thereof and including a transversely directed cross bar at the outer end thereof and a transversely directed heeling plate inwardly of the cross bar; a pair of upright tongs pivoted to the cross bar in substantially parallel relationship thereto and having lower end portions adapted to cooperatively receive a log between them, and power means secured to the tongs for actuating them to closed and open positions.*

*4. A device as in claim 3 wherein the tongs include upper end portions extending above their pivot points and the power means is secured to the upper end portions.*

References Cited in the file of this patent or the original patent

UNITED STATES PATENTS

| | | |
|---|---|---|
| 1,919,075 | Rasmussen | July 18, 1933 |
| 2,327,015 | Carlson | Aug. 17, 1943 |
| 2,418,251 | Drott | Apr. 1, 1947 |
| 2,448,124 | Roy | Aug. 31, 1948 |
| 2,488,767 | Drott et al. | Nov. 22, 1949 |